2,873,273
STEROIDS

Pietro de Ruggieri and Carlo Ferrari, Milan, Italy

No Drawing. Application September 29, 1958
Serial No. 763,798

3 Claims. (Cl. 260—239.55)

An object of this invention is a method for preparing compounds represented by the following formula

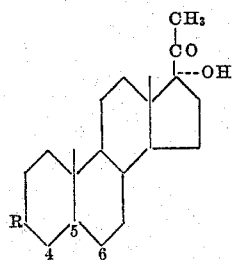

wherein R is a member selected from the group consisting of OH (double bond 5,6) and =O (double bond 4,5). By this method compounds of high biological activity in the field of progestative and cortical hormones are obtained.

As starting materials compounds represented by the following formula have been selected.

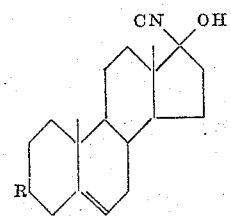

wherein R is an acetoxy group in β position or an ethylene glycol ketal.

The 3β-acetoxy-androst-5-ene-17-cyano-17-ol (A. Butenandt and J. Schmidt-Thomè, B. 71, 1487; 1938), and the 3-ethylenedioxy-androst-5-ene-17-cyano-17-ol (A. Ercoli and P. De Ruggieri, J. Am. Chem. Soc. 75, 650; 1953), when treated with 2,3-dihydropyran in presence of catalytic amounts of phosphorus oxychloride or p-toluenesulfonic acid afford the 3β-acetoxy-androst-5-ene-17β-cyano-17α-(2′-tetrahydropyranyloxy) and 3-ethylenedioxy-androst-5-ene-17β-cyano-17α-(2′-tetrahydropyranyloxy). These tetrahydropyranylethers are oriented in 17α position and are completely stable towards Gringnard's reagents instead of the free 17 hydroxy compounds; therefore, when treated with methyl-magnesiumbromide or iodide, they afford, after decomposition of the 20-ketimines and at the same time of the ethylene-dioxy group, the pregn-5-ene-3β,17α-diol-20-one and the 17α hydroxyprogesterone. The following examples are given to further illustrate the products and process of the present invention and are not to be construed as limiting.

Example 1.—Pregn-5-ene-3β,17α-diol-20-one

A solution of 1.0 part of 3β-acetoxy-androst-5-ene-17-cyano-17-ol in 4.0 parts of 2,3-dihydropyran was treated at room temperature for 4 hours with 0.05 part of phosphorus oxychloride. The solution was then diluted with ether, washed with aqueous sodium carbonate followed by water, dried over sodium sulphate and distilled at reduced pressure. The oily residue consisting of 3β-acetoxy - androst - 5 - ene - 17β - cyano - 17α - (2′ - tetrahydropyranyloxy) was submitted directly to subsequent reaction.

This residue was dissolved in 22.5 parts anisol and 49 parts of an ethereal solution of methyl magnesium iodide (from 3 parts of magnesium) were added. The ether was removed and the mixture kept at 90–95° C. for 16 hours. After decomposition with 75 parts of acetic acid and 60 parts of water, the mixture was refluxed for 15 minutes and the solvent was removed by steam distillation. The aqueous suspension was filtered and crystallized from methanol to yield the pregn-5-ene-3β,17α-diol-20-one, M. P. 265° C., $[\alpha]_D = -36°$ (diox.) already known.

Example 2.—3-ethylenedioxy-androst-5-ene-17β-cyano-17α-(2′-tetrahydropyranyloxy)

A solution of 1.0 part of 3-ethylenedioxy-androst-5-ene-17-cyano-17-ol in 4.0 parts of 2,3-dihydropyran was treated at room temperature for 4 hours with 0.05 part of p-toluenesulfonic acid. The solution was then diluted with ether, washed with aqueous sodium carbonate followed by water, dried over sodium sulphate and distilled at reduced pressure. Crystallization from ether-petroleum ether led to 3-ethylenedioxy-androst-5-ene-17β-cyano-17α-(2′-tetrahydropyranyloxy), M. P. 160–162° C.

Example 3.—Pregn-4-ene-17α-ol-3,20-dione

A solution of 1.5 parts of 3-ethylenedioxy-androst-5-ene-17β-cyano-17α-(2′-tetrahydropyranyloxy) in 25 parts of anisol was treated with 45 parts of ethereal solution of methyl magnesium bromide (from 3 parts of magnesium). The ether was removed and the mixture was kept at 90–95° C. for 16 hours. After decomposition with 70 parts of ice-cooled sulfuric acid 2 N, the mixture was refluxed for 15 minutes, the organic layer separated, and the aqueous-phase was extracted with ether.

The combined organic extracts were washed with water and distilled by steam; after filtration of the product, crystallization was accomplished from acetone to give the pregn-4-ene-17α-ol-3,20-dione, M. P. 218–220° C., $[\alpha]_D = +104°$ (acetone) already known.

We claim:
1. A method for the preparation of compounds having the general formula

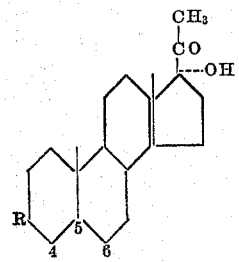

wherein R is a member selected from the group consisting of OH (double bond 5,6) and =O (double bond 4,5) which comprises reacting a member selected from the group consisting of 3β-acetoxy-androst-5-ene-17-cyano-17-ol and 3-ethylenedioxy-androst-5-ene-17-cyano-17-ol with 2,3-dihydropyran in the presence of a catalyst selected from the group consisting of phosphorus oxychloride and p-toluenesulfonic acid, treating the resulting 17α-tetrahydropyranylethers with a methyl-magnesium halide selected from the group consisting of bromide and iodide, and finally decomposing with an acid selected from the group consisting of sulfuric acid and acetic acid the resulting 20-ketimines and at the same time the ethylenedioxy group.

2. 3β-acetoxy-androst-5-ene-17β-cyano-17α-(2'-tetrahydropyranyloxy).

3. 3-ethylenedioxy-androst-5-ene-17β-cyano-17α-(2'-tetrahydropyranyloxy).

References Cited in the file of this patent

UNITED STATES PATENTS

| | | |
|---|---|---|
| 2,136,401 | Strassberger | Nov. 15, 1938 |
| 2,326,756 | Butenandt | Aug. 17, 1943 |

OTHER REFERENCES

Julian et al.: J. A. C. S., vol. 72, pages 367–70 (1950).